UNITED STATES PATENT OFFICE.

LEO STEIN, OF NEW YORK, N. Y., ASSIGNOR OF ONE-HALF TO JOHN C. DEHLS, OF BROOKLYN, NEW YORK.

COMPOUND FOR USE IN BREWING FERMENTED BEVERAGES.

1,024,158.　Specification of Letters Patent.　Patented Apr. 23, 1912.

No Drawing.　Application filed February 2, 1912. Serial No. 674,994.

*To all whom it may concern:*

Be it known that I, LEO STEIN, a subject of Germany, and a resident of New York city, in the county of New York and State of New York, have invented certain new and useful Improvements in Compounds for Use in Brewing Fermented Beverages, of which the following is a specification.

The invention relates to the art of brewing or producing fermented beverages, as beer and ale, and it consists in a novel compound to be added to the brew for the purpose of facilitating the process of manufacture and improving the products.

It has long been known that the brew-water with which beer or ale is brewed exerts a decided influence upon the final product. It has been known for many years, for instance, that the presence of calcium sulfate in the brew-water is beneficial and favors the production of light beers and ales, and when a brew-water has been deficient in calcium sulfate the brewer has added said substance thereto as a means for correcting or rendering more appropriate the water for its intended purpose. It has also been usual for a brewer to add magnesium sulfate and an alkali metal chlorid, such as sodium or potassium chlorid, to the brew-water for the purpose of securing certain proposed advantages.

The object of my invention is to provide a new compound to be added to the brew for the attainment of definite new and beneficial results in carrying on the brewing process, as, for illustration, the securing of full-bodiness, foam-stand and keeping qualities in the beer or ale under normal conditions, the prevention of the beer and ale from becoming cloudy when subjected to a low temperature, and the neutralization of carbonates, such as magnesium carbonate, calcium carbonate or sodium carbonate, often present in natural water and always detrimental to the brewing process and the final product.

A further object of the invention is to provide the compound in such form that it may be conveniently handled commercially and in the brewery and that its proper character may be maintained, so that it may, when used, be relied upon to perform its duties.

The compound of my invention preferably comprises calcium sulfate thoroughly mixed with a neutral hygroscopic salt, preferably magnesium chlorid, and an acid salt, and in its more detailed or specific form said compound will comprise a thorough admixture of calcium sulfate, a magnesium salt and an acid salt of the alkali metal group, such as potassium monophosphate, or sodium monophosphate, or sodium bisulfate, or potassium bisulfate. The value of the calcium sulfate in the brew water is well understood and therefore need not be explained. The magnesium salt which I admix with the calcium sulfate is of considerable importance in that with the use thereof the brewer is enabled to obtain full-bodiness, foam-stand and keeping qualities in the beer or ale under normal conditions and the prevention of the beer and ale from becoming cloudy when subjected to a low temperature. The preferred magnesium salt employed by me is magnesium chlorid, which is especially effective in securing in the beer or ale a good foam-stand and a fine full-bodied taste. Magnesium chlorid is a highly hygroscopic salt, which when exposed to the air will take up moisture rapidly and melt. It is therefore, while conspicuously beneficial in use, difficult to handle and can alone be safely shipped in glass only. I overcome the difficulty of handling magnesium chlorid and of supplying it to brewers by intimately mixing said chlorid with the calcium sulfate, using for this mixture a concentrated aqueous solution of the magnesium chlorid and mixing it directly with the calcium sulfate, whereby I obtain a smooth uniform powder which maintains its character for an indefinite period, does not dry out or form hard granules, shows a more rapid solubility in water than when the sulfate of calcium and the magnesium chlorid are added separately to the water and may be successfully shipped in wooden packages, the admixture with the calcium sulfate permitting the successful and convenient handling of the magnesium chlorid and the shipping of the same without the employment of glass receptacles.

The acid salts of the alkali metal group, which I admix with the calcium sulfate and the magnesium salt, have the purpose of neutralizing and eliminating carbonates of the natural water, such as calcium carbonate, magnesium carbonate or sodium carbonate, all or some of which are nearly always present. I make use of a suitable acid salt of the alkali metal group such as: potassium monophosphate or biphosphate, or sodium monophosphate or biphosphate or potassium bisulfate or sodium bisulfate.

In my use of the acid salt of the alkali metal group I preferably employ monophosphates, as phosphates exert a very favorable influence upon the fermentation, strengthening the yeast and keeping it in a healthy condition adapted for the suppression of infection of foreign micro organisms. The addition of the acid salts neutralizing the carbonates that may be in the water, obviates the detrimental effects that such carbonates, if allowed to remain, would create. The presence of carbonates is detrimental to the brewing process, in that they neutralize the natural acidity of the malt, weaken the diastase, decrease the yield and impair the taste and color of beer and its keeping qualities.

The proportions of the various salts in my compound vary and are dependent upon the composition of the water to be treated. I usually make two analyses, one with the unheated water and another with the same water heated to at least sixty degrees centigrade and subsequently filtered. Through the heating of the water a great part of the carbonates, as magnesium and calcium, is precipitated, and when mixing my compound I take only the remaining carbonates of the heated water into consideration. I neutralize the carbonates as much as possible with one of the acid salts hereinbefore mentioned and take into consideration the amount of calcium sulfate and magnesium chlorid found in the natural water, mixing the ingredients in my compound in such a manner that when proper proportions are added the water contains in every 100,000 parts about 45 parts calcium sulfate and 5 parts magnesium chlorid.

Under ordinary circumstances my compound would be composed of about from 30 to 40 parts of calcium sulfate, about from 5 to 10 parts of magnesium chlorid and about from 5 to 15 parts of the acid salt of the alkali group, but of course I do not limit myself to these proportions, since they must necessarily vary in accordance with the conditions of the various waters to be met and corrected.

What I claim as my invention and desire to secure by Letters-Patent, is:

1. A compound comprising calcium sulfate, a neutral hygroscopic salt and an acid salt, for improving the process of brewing fermented beverages.

2. A compound comprising calcium sulfate, a neutral hygroscopic salt and an acid salt of the alkali metal group, for improving the process of brewing fermented beverages.

3. A compound comprising calcium sulfate, magnesium chlorid, and an acid salt of the alkali metal group, such as potassium monophosphate or biphosphate, or sodium monophosphate or biphosphate, or potassium bisulfate, or sodium bisulfate, for improving the process of brewing fermented beverages.

4. A compound comprising calcium sulfate, and an acid salt of the alkali metal group for improving the process of brewing fermented beverages.

Signed at New York city, in the county of New York and State of New York, this 1st day of February A. D. 1912.

LEO STEIN.

Witnesses:
ARTHUR MARION,
CHAS. C. GILL.

---

Copies of this patent may be obtained for five cents each, by addressing the "Commissioner of Patents, Washington, D. C."